(12) United States Patent
Hayashi

(10) Patent No.: US 7,457,141 B2
(45) Date of Patent: Nov. 25, 2008

(54) AC ADAPTOR

(75) Inventor: Isao Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 10/786,865

(22) Filed: Feb. 24, 2004

(65) Prior Publication Data

US 2004/0164714 A1    Aug. 26, 2004

(30) Foreign Application Priority Data

Feb. 25, 2003    (JP)    ............... 2003-047956

(51) Int. Cl.
  *H02M 1/10*    (2006.01)
  *H02M 7/04*    (2006.01)
  *H02M 5/275*   (2006.01)
(52) U.S. Cl. ..................... 363/163; 363/142
(58) Field of Classification Search ............ 363/142; 320/142, 144
  See application file for complete search history.

(56) References Cited

U.S. PATENT DOCUMENTS

| 5,686,812 | A |   | 11/1997 | Hotta |
|---|---|---|---|---|
| 5,774,347 | A |   | 6/1998 | Nakanishi |
| 2001/0015634 | A1 | * | 8/2001 | Shirakawa .................. 320/110 |
| 2002/0167770 | A1 |   | 11/2002 | Kato et al. |
| 2004/0036445 | A1 | * | 2/2004 | Trembley .................... 320/116 |
| 2004/0090209 | A1 | * | 5/2004 | Nishida et al. ............. 320/149 |

FOREIGN PATENT DOCUMENTS

| JP | 58-19922 | 2/1983 |
|---|---|---|
| JP | 58-19923 | 2/1983 |
| JP | 8-214411 | 8/1996 |
| JP | 8-223907 A | 8/1996 |
| JP | 2000-333382 | 11/2000 |
| JP | 2001-218383 | 8/2001 |
| JP | 2002-10513 | 1/2002 |

OTHER PUBLICATIONS

Japanese Office Action.

* cited by examiner

*Primary Examiner*—Edward Tso
*Assistant Examiner*—Alexis Boateng
(74) *Attorney, Agent, or Firm*—Morgan & Finnegan, LLP

(57) ABSTRACT

It is an object of this invention to provide an AC adaptor capable of achieving downsizing and cost reduction, and having both a constant-voltage/constant-current control function necessary for battery charge, and an optimum current control function for driving of a low-power-consumption electronic apparatus. This AC adaptor includes a first constant-current control device which performs first constant-current control for charging a battery, a second constant-current control device which performs second constant-current control for supplying an electric current necessary to drive an electronic apparatus, and a voltage detecting device which detects the voltage drop of a DC output. If the output voltage becomes lower than a preset value, the second constant-current control for supplying the electric current necessary to drive the electronic apparatus is performed. Since this obviates the need for a large-capacity element which permits high power, it is possible to decrease the outer dimensions, and also decrease the power ratings of electronic parts.

1 Claim, 7 Drawing Sheets

AC ADAPTOR

FIELD OF THE INVENTION

The present invention relates to an AC adaptor and, more particularly, to an AC adaptor for performing outputting under constant-voltage/constant-current control in order to charge a battery.

BACKGROUND OF THE INVENTION

Conventionally, the general relationship between an AC adaptor of this type and an electronic apparatus is such that the AC adaptor is given constant-voltage/constant-current characteristics suited to battery charge, and, when the electronic apparatus is to be driven, constant-current control is temporarily delayed to control a rush current generated in the electronic apparatus.

Also, as disclosed in Japanese Patent Laid-Open No. 8-223907, a built-in charge controller which is incorporated into an electronic apparatus and performs constant-voltage/constant-current control is proposed.

Unfortunately, in a power supply apparatus of this type, it is difficult to control the maximum value of a temporal large electric current as measure to counter a rush current. Since a large-capacity element for allowing a large electric current is necessary, the system is disadvantageous in cost.

In addition, an electric current corresponding to the rush current is temporarily supplied to a battery during charging. Consequently, excess stress is applied to the battery and its internal protective element. Also, if the period during which the constant-current control is temporarily delayed is shortened, the above limitation adversely affects the operation of the electronic apparatus in some cases.

Furthermore, in Japanese Patent Laid-Open No. 8-223907 described above, the voltage of a region in which the rush current is generated in the electronic apparatus is set higher than that of the battery charging region. Accordingly, a large-capacity element which permits high power is necessary in respect of heat design in order to hold the maximum DC output. That is, this prior art has no effect on downsizing and cost reduction of the AC adaptor at all.

SUMMARY OF THE INVENTION

The present invention has been made in consideration of the above situation, and has as its object to provide an AC adaptor capable of achieving downsizing and cost reduction, and having both a constant-voltage/constant-current control function necessary for battery charge, and an optimum electric current control function optimum for driving of a low-power-consumption electronic apparatus.

To solve the above problem and achieve the above object, according to a first aspect of the present invention, there is provided an AC adaptor separated from an electronic apparatus, and having a DC output unit which performs outputting under constant-voltage/constant-current control in order to charge a battery connected to the electronic apparatus, comprising:

a first constant-current control device which performs first constant-current control for charging the battery;

a second constant-current control device which performs second constant-current control for supplying an electric current necessary to drive the electronic apparatus; and a voltage detecting device which detects a voltage drop of the DC output, wherein if the output voltage becomes lower than a preset value, the second constant-current control for supplying the electric current necessary to drive the electronic apparatus is performed.

According to a second aspect of the present invention, there is provided an AC adaptor separated from an electronic apparatus, and having a DC output unit which performs outputting under constant-voltage/constant-current control in order to charge a battery connected to the electronic apparatus, comprising:

a first constant-current control device which performs first constant-current control for charging the battery;

a second constant-current control device which performs second constant-current control for supplying an electric current necessary to drive the electronic apparatus;

a voltage detecting device which detects a voltage drop of the DC output; and an internal temperature detecting device which detects an internal temperature, wherein if the internal temperature becomes higher than a preset value, the DC output is shut down or the first constant-current control for charging the battery is performed.

According to a third aspect of the present invention, there is provided an AC adaptor separated from an electronic apparatus, and having a DC output unit which performs outputting under constant-voltage/constant-current control in order to charge a battery connected to the electronic apparatus, comprising:

a first constant-current control device which performs first constant-current control for charging the battery;

a second constant-current control device which performs second constant-current control for supplying an electric current necessary to drive the electronic apparatus;

a voltage detecting device which detects a voltage drop of the DC output; and a timer device which starts when detecting the electric current necessary to drive the electronic apparatus, wherein if the constant-current control for supplying the electric current necessary to drive the electronic apparatus continues for not less than a preset time, the DC output is shut down or the first constant-current control for charging the battery is performed.

According to a fourth aspect of the present invention, there is provided an electric current control method for an AC adaptor separated from an electronic apparatus, and having a DC output unit which performs outputting under constant-voltage/constant-current control in order to charge a battery connected to the electronic apparatus, comprising:

a first constant-current control step of performing first constant-current control for charging the battery;

a second constant-current control step of performing second constant-current control for supplying an electric current necessary to drive the electronic apparatus; and a voltage detection step of detecting a voltage drop of the DC output, wherein if the output voltage becomes lower than a preset value, the second constant-current control step of supplying the electric current necessary to drive the electronic apparatus is performed.

According to a fifth aspect of the present invention, there is an electric current control method for an AC adaptor separated from an electronic apparatus, and having a DC output unit which performs outputting under constant-voltage/constant-current control in order to charge a battery connected to the electronic apparatus, comprising:

a first constant-current control step of performing first constant-current control for charging the battery;

a second constant-current control step of performing second constant-current control for supplying an electric current necessary to drive the electronic apparatus;

a voltage detection step of detecting a voltage drop of the DC output; and an internal temperature detection step of detecting an internal temperature, wherein if the internal temperature becomes higher than a preset value, a step of shutting down the DC output, or the step of first constant-current control for charging the battery is performed.

According to a sixth aspect of the present invention, there is provided an electric current control method for an AC adaptor separated from an electronic apparatus, and having a DC output unit which performs outputting under constant-voltage/constant-current control in order to charge a battery connected to the electronic apparatus, comprising:

a first constant-current control step of performing first constant-current control for charging the battery;

a second constant-current control step of performing second constant-current control for supplying an electric current necessary to drive the electronic apparatus;

a voltage detection step of detecting a voltage drop of the DC output; and a timer step which starts when detecting the electric current necessary to drive the electronic apparatus, wherein if the constant-current control step of supplying the electric current necessary to drive the electronic apparatus continues for not less than a preset time, a step of shutting down the DC output, or the step of first constant-current control for charging the battery is performed.

According to a seventh aspect of the present invention, there is provided a computer program for allowing a computer to execute an electric current control method for an AC adaptor separated from an electronic apparatus, and having a DC output unit which performs outputting under constant-voltage/constant-current control in order to charge a battery connected to the electronic apparatus, comprising:

a first constant-current control step of performing first constant-current control for charging the battery;

a second constant-current control step of performing second constant-current control for supplying an electric current necessary to drive the electronic apparatus; and a voltage detection step of detecting a voltage drop of the DC output, wherein if the output voltage becomes lower than a preset value, the second constant-current control step of supplying the electric current necessary to drive the electronic apparatus is performed.

According to a eighth aspect of the present invention, there is provided a computer program for allowing a computer to execute an electric current control method for an AC adaptor separated from an electronic apparatus, and having a DC output unit which performs outputting under constant-voltage/constant-current control in order to charge a battery connected to the electronic apparatus, comprising:

a first constant-current control step of performing first constant-current control for charging the battery;

a second constant-current control step of performing second constant-current control for supplying an electric current necessary to drive the electronic apparatus;

a voltage detection step of detecting a voltage drop of the DC output; and an internal temperature detection step of detecting an internal temperature, wherein if the internal temperature becomes higher than a preset value, a step of shutting down the DC output, or the step of first constant-current control for charging the battery is performed.

According to a ninth aspect of the present invention, there is provided a computer program for allowing a computer to execute an electric current control method for an AC adaptor separated from an electronic apparatus, and having a DC output unit which performs outputting under constant-voltage/constant-current control in order to charge a battery connected to the electronic apparatus, comprising:

a first constant-current control step of performing first constant-current control for charging the battery;

a second constant-current control step of performing second constant-current control for supplying an electric current necessary to drive the electronic apparatus;

a voltage detection step of detecting a voltage drop of the DC output; and a timer step which starts when detecting the electric current necessary to drive the electronic apparatus, wherein if the constant-current control step of supplying the electric current necessary to drive the electronic apparatus continues for not less than a preset time, a step of shutting down the DC output, or the step of first constant-current control for charging the battery is performed.

According to a tenth aspect of the present invention, there is provided a recording medium recording aforementioned program.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

AC adaptors of embodiments will be described below with reference to the accompanying drawings.

Figure 7:
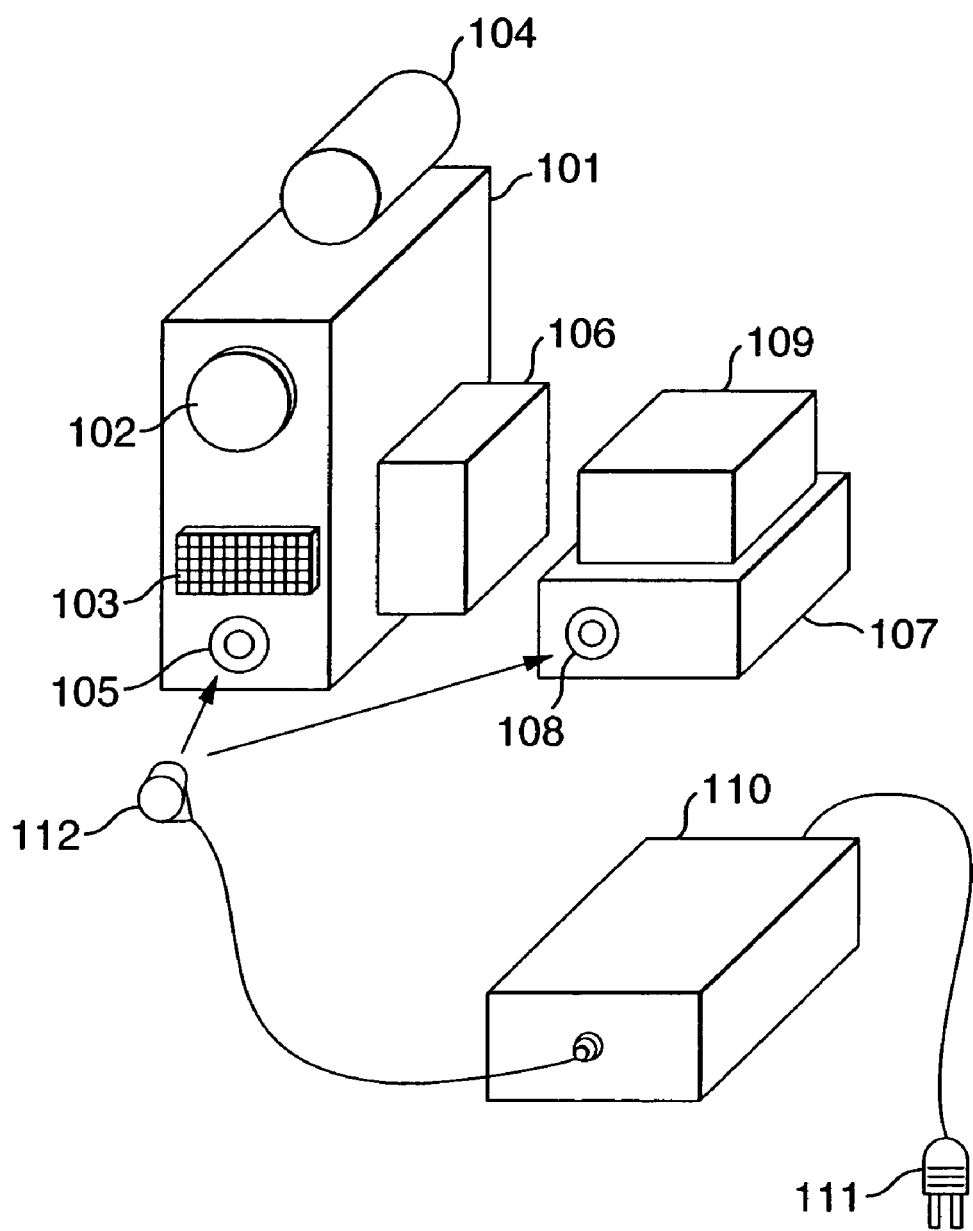
FIG. 7 is a view showing an example of a charging system to which the AC adaptors of the present invention are applied.

FIG. 7 is a view showing an example of a charging system to which these AC adaptors of the present invention are applied. In FIG. 7, reference numeral 101 denotes a video camera; 102, a lens; 103, a built-in microphone; 104, a viewfinder; 105, a DC input unit of the video camera; 106 and 109, battery packs; 107, a charger; 108, a DC input unit of the charger; 110, an AC adaptor of each embodiment; 111, an AC plug; and 112, a DC output unit.

First Embodiment

Figure 1:
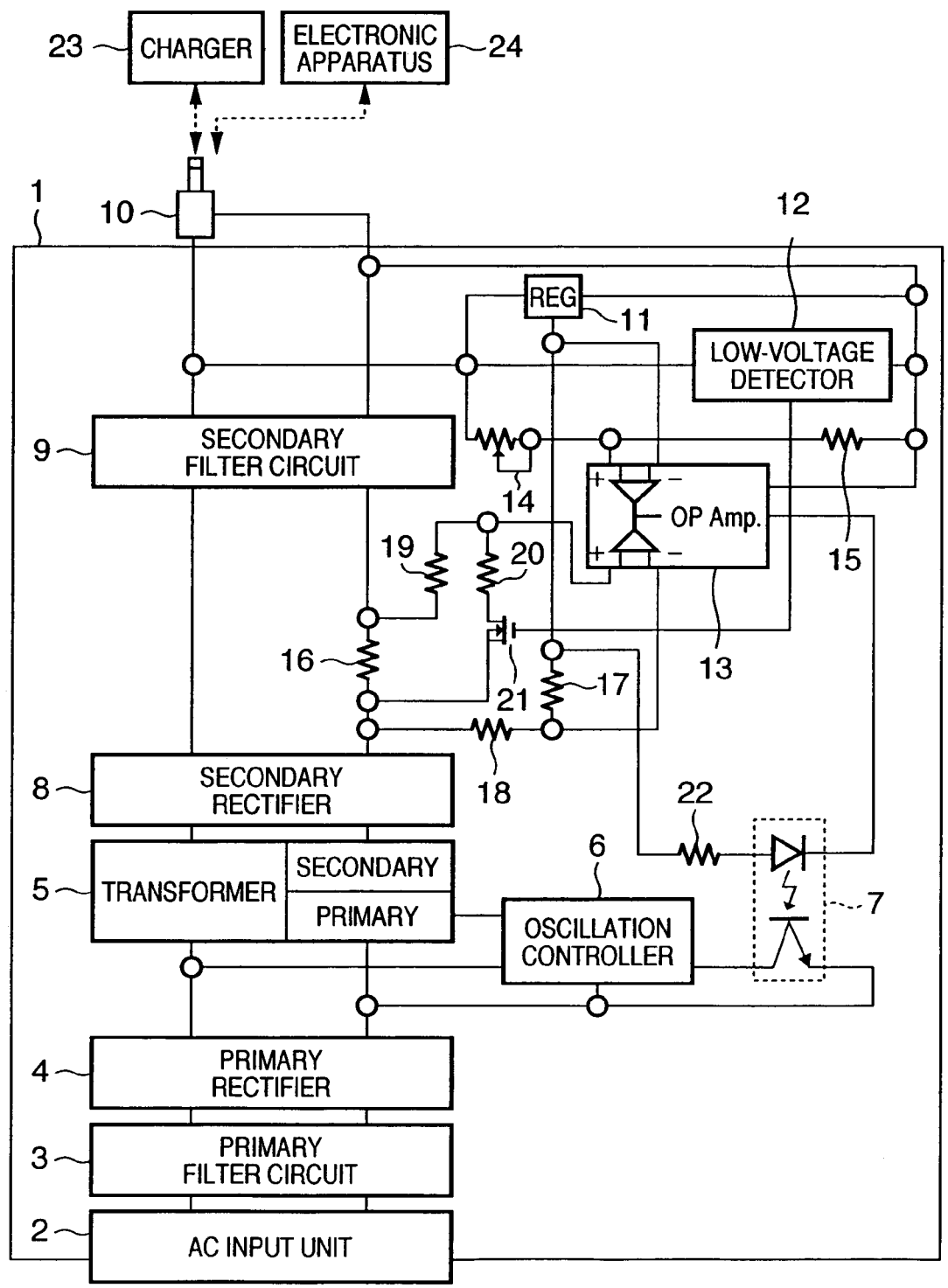
FIG. 1 is a block diagram best illustrating the arrangement of an AC adaptor according to the first embodiment of the present invention.

FIG. 1 is a block diagram best illustrating the arrangement of an AC adaptor of this embodiment.

In FIG. 1, reference numeral 1 denotes the AC adaptor; 2, an AC input unit; 3, a primary filter circuit; 4, a primary rectifier; 5, a switching transformer; 6, an oscillation controller; 7, a photocoupler; 8, a secondary rectifier; 9, a secondary filter circuit; 10, a DC output unit; 11, a regulator; and 12, a low-voltage detector.

Reference numeral 13 denotes an operational amplifier; 14, a volume control for adjusting the output voltage; 15, a resistor for dividing the output voltage; 16, a resistor for detecting the output current; 17 and 18, resistors for adjusting the output electric current; 19, a resistor for feeding back the output electric current; 20, a resistor for changing a constant-current control value if the output voltage becomes lower than a value set by the low-voltage detector; 21, a switch for changing the constant-current control value; 22, a current limiting resistor of the photocoupler; 23, a charger; and 24, an electronic apparatus.

As shown in FIG. 1, when an AC input is supplied to the AC input unit 2, the output voltage is fed back to the operational amplifier 13 by the volume control 14 and resistor 15, and the operation is so performed as to stabilize the DC output unit 10. The voltage of the DC output unit 10 is adjusted to a battery charging voltage by the volume control 14.

Also, the voltage across the current detecting resistor 16 is proportional to an electric current supplied to the DC output unit 10, and hence is set at the first constant-current value via the resistors 18 and 19 and operational amplifier 13. The first constant-current value is suited to battery charge, and charging is performed under constant-voltage/constant-current control with this arrangement.

When the electronic apparatus 24 is attached to the DC output unit 10, the first constant-current output is used in a normal operation state. In this state, if a rush current is generated in the electronic apparatus 24, the output voltage from the DC output unit 10 lowers.

If the low-voltage detector 12 detects that the output voltage lowers to a preset value, the switch 21 is turned on to set the second constant-current value. With this control, even when a rush current is generated in the electronic apparatus 24, the output voltage does not become lower than the output voltage set by the low-voltage detector 12, so the operation of the electronic apparatus 24 is ensured.

Also, even when the output is short-circuited in an abnormal state, the maximum electric current is fixed to the second constant-current output. This alleviates heat design of the heat generating portion, and makes downsizing of the main body possible. In FIG. 1, a general circuit configuration unnecessary for the explanation of the AC adaptor is omitted. In addition, although internal charging of the electronic apparatus is not explained in FIG. 1, this internal charging is of course also possible.

Figure 2:
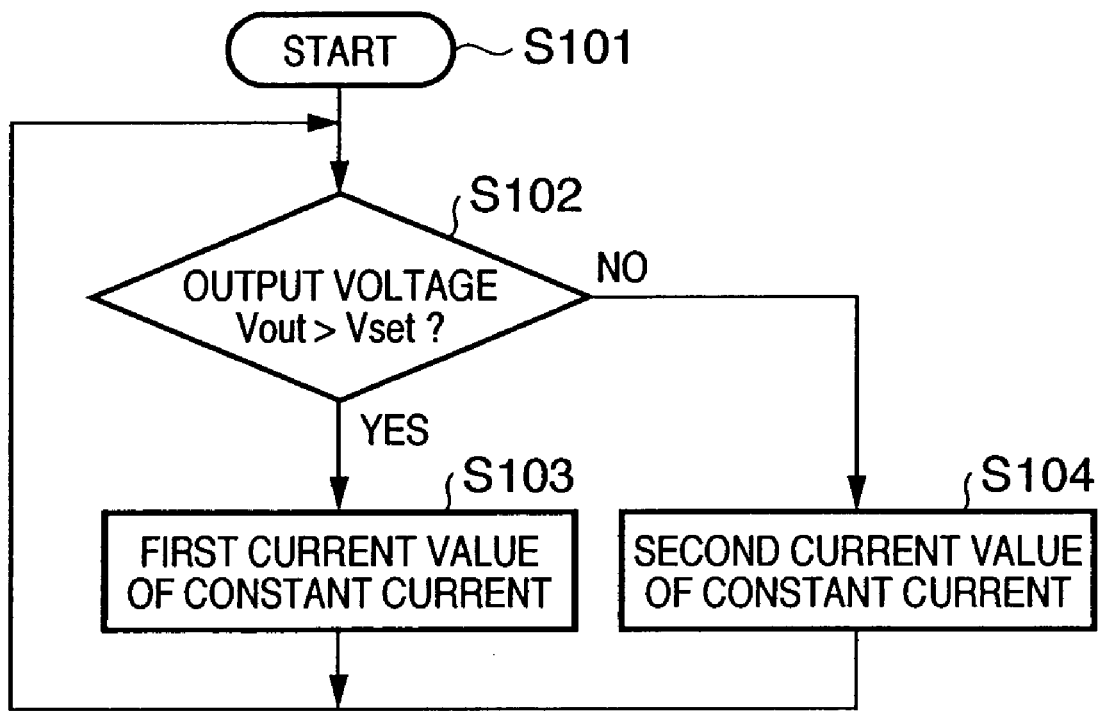
FIG. 2 is a flow chart for explaining the operation of the AC adaptor according to the first embodiment.

FIG. 2 is a flow chart for explaining the operation of the AC adaptor of the first embodiment.

Referring to FIG. 2, S(Step)101 is a start step, S102 is an output voltage detecting/branching step, S103 is a step of setting the constant-current value at the first current value, and S104 is a step of setting the constant-current value at the second current value.

When the process is started in step S101, the output voltage is detected in step S102 to determine whether the output voltage is higher than the voltage preset by the low-voltage detector 12. If the output voltage is higher than the set voltage, the flow advances to step S103 to set the constant-current value at the first current value.

If in step S102 the output voltage is equal to or lower than the set voltage, the flow advances to step S104 to set the constant-current value at the second current value. This control is constantly performed.

Figure 3:
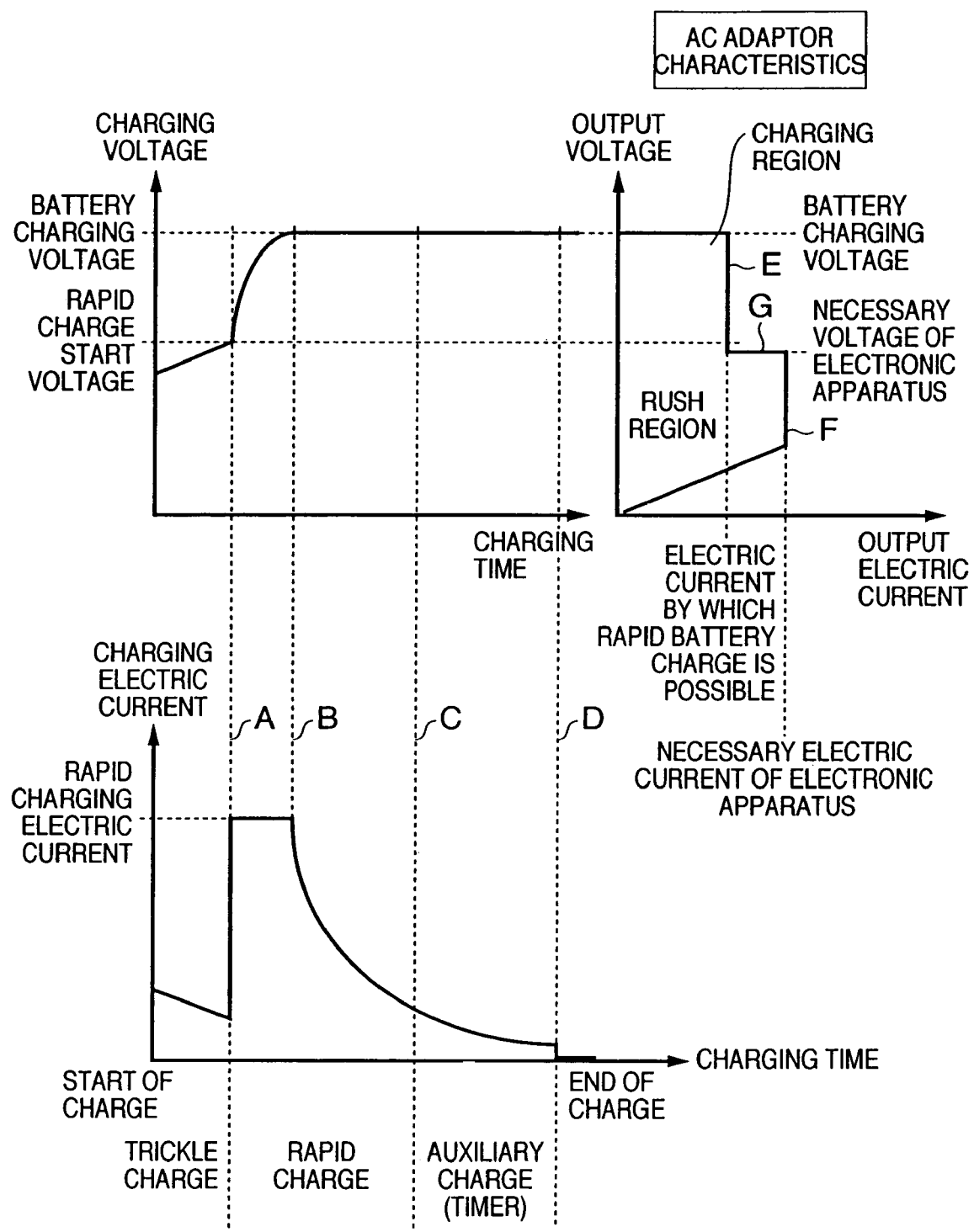
FIG. 3 is a view showing an example of output control according to the first embodiment.

FIG. 3 is a view showing an example of output control performed (for a lithium ion secondary battery) by the AC adaptor according to the first embodiment of the present invention. Referring to FIG. 3, the upper graph shows a change in battery voltage during charging, the lower graph shows a change in charging electric current as a function of the battery voltage change, and the right graph shows the output characteristics of the AC adaptor of this embodiment.

Generally, a charger performs trickle charge until the battery voltage reaches a rapid charge start voltage, and starts rapid charge when the charging voltage of the battery rises to the rapid charge start voltage (point A). The detection voltage of the low-voltage detector 12 of the AC adaptor is set at a necessary voltage (point G) of the electronic apparatus. Since the rapid charge start voltage of the battery is higher than point G, the AC adaptor starts the constant-voltage/constant-current operation at the first current value (point E).

When the battery voltage rises to a battery charging voltage (point B) after that, the output electric current drops in accordance with the characteristics of the battery. When the charging voltage and charging electric current of the battery reach preset conditions (point C), the charger 23 performs full charge indication and switches to auxiliary charging. This auxiliary charging is terminated by timer cut (point D).

When the electronic apparatus 24 is connected, the electronic apparatus 24 operates in a charging region in a normal operation. Even when a rush current is generated in the electronic apparatus, a voltage higher than point G is necessary. Therefore, if the output voltage lowers to the set voltage of the low-voltage detector 12, the electric current value is changed to the second current value (point F) required for the electronic apparatus. By this control, the voltage (point G) necessary for the electronic apparatus is assured.

It is experimentally known that the necessary outer dimensions of the AC adaptor 1 are substantially proportional to the maximum electric energy (output voltage×output electric current). The rating of a large-capacity element which permits high power is also limited by this maximum electric energy.

As has been explained above, the maximum electric energy required of the AC adaptor 1 can be suppressed by providing the AC adaptor 1 with a constant-voltage/constant-current output device suited to battery charge, a constant-current output device corresponding to a rush current of the electronic apparatus 24, a device for detecting an output voltage drop, and a switching device for switching the constant-current set values in accordance with the result of detection of the DC output voltage drop.

This is so because the level of "battery charging voltage× first current value" is the same as the level of "voltage required for electronic apparatus×second current value", and optimum control for this output characteristic can be performed.

Second Embodiment

Figure 4:
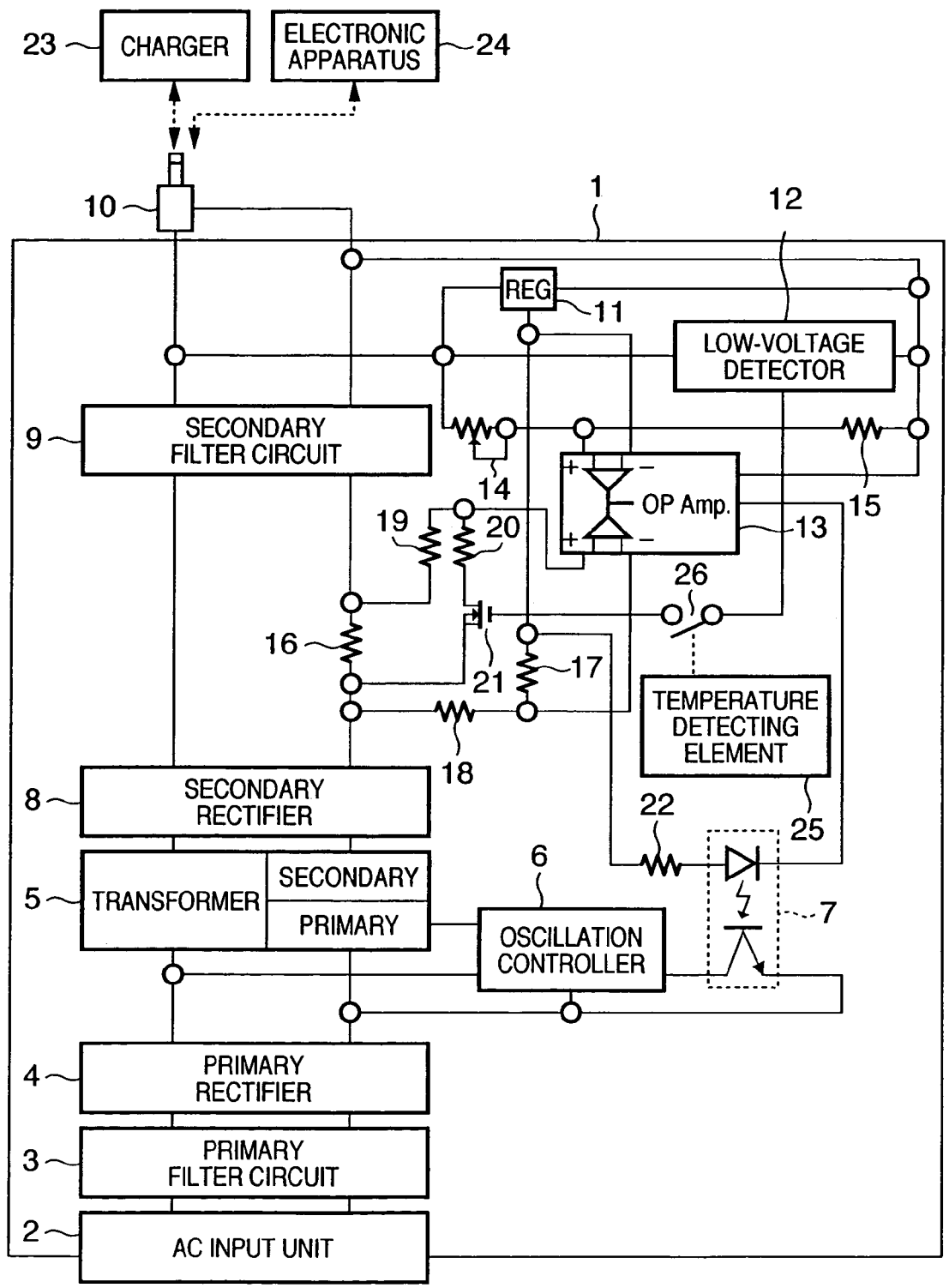
FIG. 4 is a block diagram showing the arrangement of an AC adaptor according to the second embodiment of the present invention.

FIG. 4 is a block diagram showing the arrangement of an AC adaptor according to the second embodiment of the present invention.

In FIG. 4, reference numerals 1 to 24 are the same reference numerals as used in FIG. 1. Reference numeral 25 denotes a temperature detecting element; and 26, a switch. The switch 26 is normally ON.

If, however, a constant-current set value is fixed at the second current value for a predetermined time or longer owing to abnormality of an electronic apparatus 24, the internal temperature of an AC adaptor 1 rises. If the temperature detecting element 25 detects that this internal temperature has reached a preset temperature, the temperature detecting element 25 turns off the switch 26. Consequently, the constant-current set value is set to the first value described above, and the internal temperature lowers.

This control makes it possible to provide the AC adaptor 1 capable of safely stopping the operation even when abnormality occurs in the electronic apparatus 24.

Third Embodiment

Figure 5:
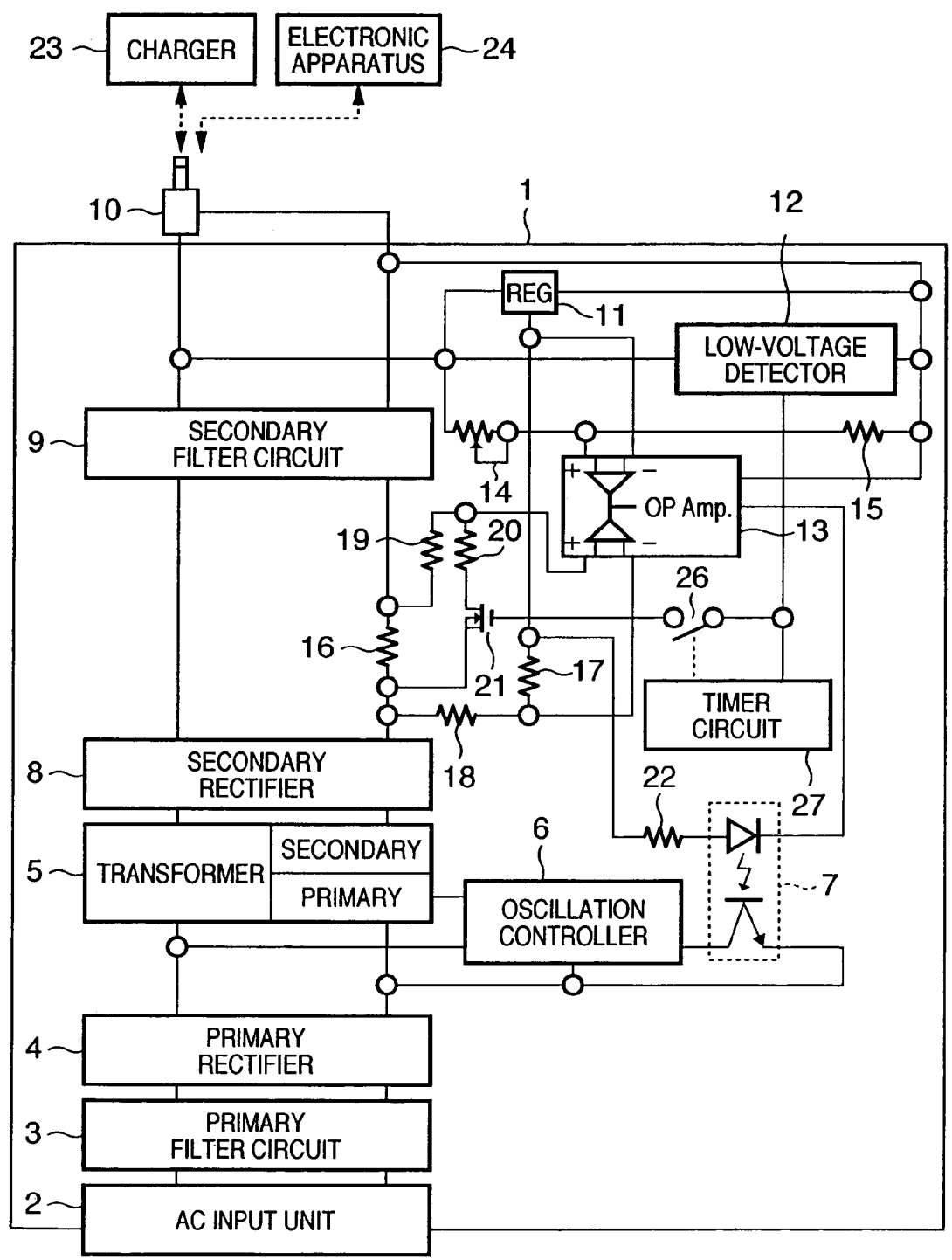
FIG. 5 is a block diagram showing the arrangement of an AC adaptor according to the third embodiment of the present invention.

FIG. 5 is a block diagram showing the arrangement of an AC adaptor according to the third embodiment of the present invention. In FIG. 5, reference numerals 1 to 24 are the same reference numerals as used in FIG. 1.

Reference numeral 27 denotes a timer circuit which starts after a rush current is generated in the electronic apparatus 24 and a constant-current set value is set to a second current value. If the rush current continues for a preset time or longer, the timer circuit 27 turns off a switch 26. By this control, the constant-current set value is set to the first value mentioned earlier.

As describe above, the timer device measures the rush current output time of the electronic apparatus. Accordingly, an AC adaptor capable of safely stopping the operation even when abnormality occurs in the electronic apparatus can be provided.

Fourth Embodiment

Figure 6:
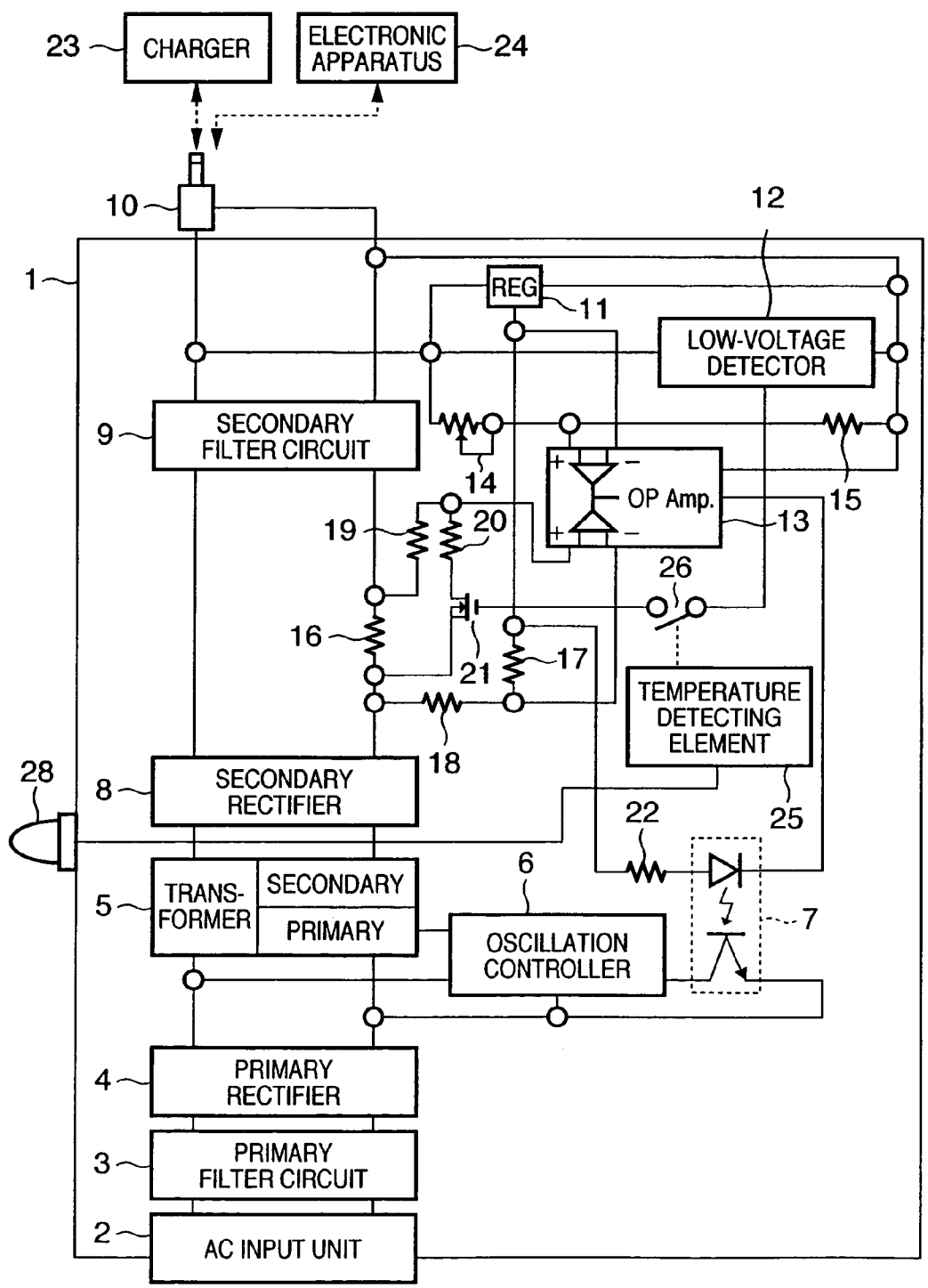
FIG. 6 is a block diagram showing the arrangement of an AC adaptor according to the fourth embodiment of the present invention.

FIG. 6 is a block diagram showing the arrangement of an AC adaptor according to the fourth embodiment of the present invention. In FIG. 6, reference numerals 1 to 26 are the same reference numerals as used in FIG. 4. Reference numeral 28 denotes a display device.

If abnormality of the electronic apparatus 24 or charger 23 is detected in the second or third embodiment described above, the display device 28 notifies the user of this abnormality.

A method of displaying the abnormality on the display device 28 can be any of, e.g., sound generation, liquid crystal display, and vibration display. Although not shown, it is also possible to use a communication device which communicates with the electronic apparatus 24 and, when abnormality occurs, display this abnormality on the electronic apparatus 24.

In the fourth embodiment, if abnormality occurs in the electronic apparatus 24, the user can be immediately and reliably notified of the abnormality by the display device 28.

Other Embodiment of the Present Invention

The present invention can be applied to a system constituted by a plurality of devices or to an apparatus comprising a single device.

Further, the object of the present invention can also be achieved by supplying the program code of software for implementing the functions of the above embodiments to a computer of an apparatus or system connected to various devices, so as to operate the various devices to implement the functions of the above embodiment, and by operating the various devices in accordance with the program stored in the computer (CPU or MPU) of the system or apparatus.

In this case, the program code of the software implements the functions of the above embodiments, and the program code itself and a means for supplying the program code to the computer, e.g., a storage medium storing the program code constitute the present invention. As this storage medium storing the program code, it is possible to use, e.g., a flexible disk, hard disk, optical disk, magnetooptical disk, CD-ROM, magnetic tape, nonvolatile memory card, and ROM.

Furthermore, besides the functions of the above embodiments are implemented by executing the supplied program code by the computer, the present invention includes a case where the program code implements the functions of the embodiments in cooperation with an OS (Operating System) or another application software running on the computer.

Furthermore, the present invention also includes a case where the supplied program code is stored in a memory of a function expansion board of the computer or of a function expansion unit connected to the computer, and, in accordance with designations by the program code, a CPU or the like of the function expansion board or function expansion unit performs part or the whole of actual processing, thereby implementing the functions of the above embodiments.

In each of the embodiments as described above, the AC adaptor includes a first constant-current control device for performing first constant-current control for charging a battery, a second constant-current control device for performing second constant-current control for supplying an electric current necessary to drive an electronic apparatus, and a voltage detecting device for detecting the voltage drop of a DC output. If the output voltage becomes lower than a preset value, the second constant-current control for supplying the electric current necessary to drive the electronic apparatus is performed. Since this obviates the need for a large-capacity element which permits high power, it is possible to decrease the outer dimensions, and also decrease the power ratings of electronic parts. This makes it possible to supply a compact inexpensive AC adaptor optimum for charging the battery of an electronic apparatus such as a video camera or digital camera and supplying power to this electronic apparatus.

It is also possible, by using a temperature detecting element, to provide an AC adaptor capable of safely stopping the operation even when abnormality occurs in an electronic apparatus.

Additionally, it is possible, by using a timer device which measures the time of rush current output in an electronic apparatus, to provide an AC adaptor capable of safely stopping the operation even when abnormality occurs in the electronic apparatus.

Furthermore, it is possible, by using a display device which displays abnormality of an electronic apparatus or charger, to provide an AC adaptor capable of immediately and reliably notifying the user of the abnormality.

As many apparently widely different embodiments of the present invention can be made without departing from the spirit and scope thereof, it is to be understood that the invention is not limited to the specific embodiments thereof except as defined in the appended claims.

What is claimed is:

1. A power supply device having a DC output unit which performs outputting under constant-voltage/constant-current control, comprising:

a constant-current control device which performs a first constant-current control operation for maintaining a first current value and a second constant-current control operation for maintaining a second current value which is larger than the first current value;

a voltage detecting device which detects a voltage drop of the DC output which is caused by a rush current;

a temperature detecting device which detects a temperature of the power supply device; and a switching device which switches a constant-current control operation from the first constant-current control operation to the second constant-current control operation when said voltage detecting device detects a voltage drop of the DC output while said constant-current control device performs the first constant-current control operation, and switches a constant-current control operation from the second constant-current control operation to the first constant-current control operation when said temperature detecting device detects that a temperature of the power supply device exceeds a predetermined temperature while said constant-current control device performs the second constant-current control operation.

* * * * *